United States Patent
Colombo et al.

(10) Patent No.: US 9,463,829 B2
(45) Date of Patent: Oct. 11, 2016

(54) ELASTICALLY AVERAGED ALIGNMENT SYSTEMS AND METHODS

(71) Applicant: GM GLOBAL TECHNOLOGY OPERATIONS LLC, Detroit, MI (US)

(72) Inventors: Joel Colombo, Howell, MI (US); Steven E. Morris, Fair Haven, MI (US); Jennifer P. Lawall, Waterford, MI (US); Ashish M. Gollapalli, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 14/185,422

(22) Filed: Feb. 20, 2014

(65) Prior Publication Data
US 2015/0232130 A1 Aug. 20, 2015

(51) Int. Cl.
*B62D 27/02* (2006.01)
*B60R 13/00* (2006.01)
*F16B 19/00* (2006.01)
*F16B 5/06* (2006.01)

(52) U.S. Cl.
CPC ............ *B62D 27/023* (2013.01); *B60R 13/005* (2013.01); *F16B 5/0657* (2013.01); *F16B 19/004* (2013.01); *Y10T 29/49826* (2015.01); *Y10T 403/1624* (2015.01)

(58) Field of Classification Search
None
See application file for complete search history.

(56) References Cited

U.S. PATENT DOCUMENTS

| | | | |
|---|---|---|---|
| 1,219,398 A * | 3/1917 | Huntsman | 294/94 |
| 1,261,036 A | 4/1918 | Kerns | |
| 1,301,302 A | 4/1919 | Nolan | |
| 1,556,233 A | 10/1925 | Maise | |
| 1,819,126 A | 8/1931 | Scheibe | |

(Continued)

FOREIGN PATENT DOCUMENTS

| CN | 1036250 A | 10/1989 |
|---|---|---|
| CN | 1205285 A | 1/1999 |

(Continued)

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

(Continued)

*Primary Examiner* — Matthieu Setliff
(74) *Attorney, Agent, or Firm* — Cantor Colburn LLP (57) ABSTRACT

In one aspect, an elastically averaged alignment system includes a first component having an interior cavity and an alignment member positioned at least partially within the interior cavity, a second component having an inner wall defining an alignment aperture, the alignment aperture configured to receive the alignment member to couple the first component and the second component, and a third component seated within the interior cavity. The alignment member is an elastically deformable material such that (a) when the third component is inserted into the interior cavity, the alignment member elastically deforms to an elastically averaged configuration to facilitate aligning the third component and the first component in a desired orientation, and (b) when the alignment member is inserted into the alignment aperture, the alignment member further elastically deforms to an elastically averaged final configuration to facilitate aligning the first component and the second component in a desired orientation.

6 Claims, 2 Drawing Sheets

(56) References Cited

U.S. PATENT DOCUMENTS

| | | | |
|---|---|---|---|
| 1,929,848 A * | 10/1933 | Neely | 403/157 |
| 1,968,168 A | 7/1934 | Place | |
| 1,982,076 A | 11/1934 | Spahn | |
| 2,006,525 A | 7/1935 | Thal | |
| 2,267,558 A * | 12/1941 | Fernberg | 24/453 |
| 2,275,103 A | 3/1942 | Gooch et al. | |
| 2,275,900 A | 3/1942 | Hall | |
| 2,482,488 A | 9/1949 | Franc | |
| 2,612,139 A | 9/1952 | Collins | |
| 2,688,894 A | 9/1954 | Modrey | |
| 2,707,607 A | 5/1955 | O'Connor | |
| 2,778,399 A | 1/1957 | Mroz | |
| 2,780,128 A | 2/1957 | Rapata | |
| 2,862,040 A | 11/1958 | Curran | |
| 2,902,902 A | 9/1959 | Slone | |
| 2,946,612 A | 7/1960 | Ahlgren | |
| 3,005,282 A | 10/1961 | Christiansen | |
| 3,014,563 A | 12/1961 | Bratton | |
| 3,087,352 A | 4/1963 | Daniel | |
| 3,089,269 A | 5/1963 | McKiernan | |
| 3,130,512 A | 4/1964 | Van Buren, Jr. | |
| 3,168,961 A | 2/1965 | Yates | |
| 3,169,004 A | 2/1965 | Rapata | |
| 3,169,439 A | 2/1965 | Rapata | |
| 3,188,731 A | 6/1965 | Sweeney | |
| 3,194,292 A | 7/1965 | Borowsky | |
| 3,213,189 A | 10/1965 | Mitchell et al. | |
| 3,230,592 A | 1/1966 | Hosea | |
| 3,233,358 A | 2/1966 | Dehm | |
| 3,233,503 A | 2/1966 | Birger | |
| 3,244,057 A | 4/1966 | Mathison | |
| 3,248,995 A | 5/1966 | Meyer | |
| 3,291,495 A | 12/1966 | Liebig | |
| 3,310,929 A | 3/1967 | Garvey | |
| 3,413,752 A | 12/1968 | Perry | |
| 3,473,283 A * | 10/1969 | Meyer | 52/718.05 |
| 3,531,850 A | 10/1970 | Durand | |
| 3,643,968 A | 2/1972 | Horvath | |
| 3,680,272 A | 8/1972 | Meyer | |
| 3,842,565 A | 10/1974 | Brown et al. | |
| 3,845,961 A | 11/1974 | Byrd, III | |
| 3,847,492 A | 11/1974 | Kennicutt et al. | |
| 3,895,408 A | 7/1975 | Leingang | |
| 3,905,570 A | 9/1975 | Nieuwveld | |
| 3,972,550 A | 8/1976 | Boughton | |
| 4,035,874 A | 7/1977 | Liljendahl | |
| 4,039,215 A | 8/1977 | Minhinnick | |
| 4,042,307 A * | 8/1977 | Jarvis | 403/290 |
| 4,043,585 A | 8/1977 | Yamanaka | |
| 4,158,511 A | 6/1979 | Herbenar | |
| 4,169,297 A * | 10/1979 | Weihrauch | 15/145 |
| 4,213,675 A | 7/1980 | Pilhall | |
| 4,237,573 A * | 12/1980 | Weihrauch | 15/145 |
| 4,300,851 A * | 11/1981 | Thelander | 403/319 |
| 4,313,609 A | 2/1982 | Clements | |
| 4,314,417 A | 2/1982 | Cain | |
| 4,318,208 A | 3/1982 | Borja | |
| 4,325,574 A | 4/1982 | Umemoto et al. | |
| 4,363,839 A | 12/1982 | Watanabe et al. | |
| 4,364,150 A | 12/1982 | Remington | |
| 4,384,803 A | 5/1983 | Cachia | |
| 4,394,853 A | 7/1983 | Lopez-Crevillen et al. | |
| 4,406,033 A | 9/1983 | Chisholm et al. | |
| 4,477,142 A | 10/1984 | Cooper | |
| 4,481,160 A | 11/1984 | Bree | |
| 4,575,060 A | 3/1986 | Kitagawa | |
| 4,605,575 A | 8/1986 | Auld et al. | |
| 4,616,951 A * | 10/1986 | Maatela | 403/290 |
| 4,648,649 A | 3/1987 | Beal | |
| 4,654,760 A | 3/1987 | Matheson et al. | |
| 4,745,656 A | 5/1988 | Revlett | |
| 4,767,647 A | 8/1988 | Bree | |
| 4,805,272 A | 2/1989 | Yamaguchi | |
| 4,807,335 A * | 2/1989 | Candea | 24/453 |
| 4,817,999 A | 4/1989 | Drew | |
| 4,819,983 A | 4/1989 | Alexander et al. | |
| 4,881,764 A * | 11/1989 | Takahashi et al. | 292/13 |
| 4,973,212 A | 11/1990 | Jacobs | |
| 4,977,648 A | 12/1990 | Eckerud | |
| 5,139,285 A | 8/1992 | Lasinski | |
| 5,154,479 A | 10/1992 | Sautter, Jr. | |
| 5,170,985 A | 12/1992 | Killworth et al. | |
| 5,180,219 A | 1/1993 | Geddie | |
| 5,208,507 A | 5/1993 | Jung | |
| 5,212,853 A | 5/1993 | Kaneko | |
| 5,234,122 A | 8/1993 | Cherng | |
| 5,297,322 A | 3/1994 | Kraus | |
| 5,342,139 A | 8/1994 | Hoffman | |
| 5,368,797 A | 11/1994 | Quentin et al. | |
| 5,397,206 A | 3/1995 | Sihon | |
| 5,407,310 A * | 4/1995 | Kassouni | B29C 70/76 29/525.02 |
| 5,446,965 A | 9/1995 | Makridis | |
| 5,507,610 A | 4/1996 | Benedetti et al. | |
| 5,513,603 A | 5/1996 | Ang et al. | |
| 5,524,786 A | 6/1996 | Skudlarek | |
| 5,538,079 A | 7/1996 | Pawlick | |
| 5,556,808 A | 9/1996 | Williams et al. | |
| 5,575,601 A | 11/1996 | Skufca | |
| 5,577,301 A | 11/1996 | Demaagd | |
| 5,577,779 A | 11/1996 | Dangel | |
| 5,580,204 A | 12/1996 | Hultman | |
| 5,586,372 A | 12/1996 | Eguchi et al. | |
| 5,601,453 A | 2/1997 | Horchler | |
| 5,634,757 A | 6/1997 | Schanz | |
| 5,657,516 A | 8/1997 | Berg et al. | |
| 5,666,749 A | 9/1997 | Waters | |
| 5,667,271 A | 9/1997 | Booth | |
| 5,670,013 A | 9/1997 | Huang et al. | |
| 5,698,276 A | 12/1997 | Mirabitur | |
| 5,736,221 A | 4/1998 | Hardigg et al. | |
| 5,765,942 A | 6/1998 | Shirai et al. | |
| 5,795,118 A | 8/1998 | Osada et al. | |
| 5,797,170 A | 8/1998 | Akeno | |
| 5,803,646 A * | 9/1998 | Weihrauch | 403/290 |
| 5,806,915 A | 9/1998 | Takabatake | |
| 5,810,535 A | 9/1998 | Fleckenstein et al. | |
| 5,820,292 A * | 10/1998 | Fremstad | 403/403 |
| 5,846,631 A | 12/1998 | Nowosiadly | |
| 5,941,673 A | 8/1999 | Hayakawa et al. | |
| 6,073,315 A | 6/2000 | Rasmussen | |
| 6,095,594 A | 8/2000 | Riddle et al. | |
| 6,164,603 A * | 12/2000 | Kawai | 248/73 |
| 6,193,430 B1 | 2/2001 | Culpepper et al. | |
| 6,202,962 B1 | 3/2001 | Snyder | |
| 6,209,175 B1 | 4/2001 | Gershenson | |
| 6,209,178 B1 | 4/2001 | Wiese et al. | |
| 6,264,869 B1 | 7/2001 | Notarpietro et al. | |
| 6,299,478 B1 | 10/2001 | Jones et al. | |
| 6,321,495 B1 | 11/2001 | Oami | |
| 6,349,904 B1 | 2/2002 | Polad | |
| 6,354,815 B1 | 3/2002 | Svihla et al. | |
| 6,378,931 B1 | 4/2002 | Kolluri et al. | |
| 6,398,449 B1 | 6/2002 | Loh | |
| 6,484,370 B2 | 11/2002 | Kanie et al. | |
| 6,485,241 B1 | 11/2002 | Oxford | |
| 6,523,817 B1 | 2/2003 | Landry, Jr. | |
| 6,533,391 B1 | 3/2003 | Pan | |
| 6,543,979 B2 | 4/2003 | Iwatsuki | |
| 6,557,260 B1 | 5/2003 | Morris | |
| 6,568,701 B1 | 5/2003 | Burdack et al. | |
| 6,579,397 B1 | 6/2003 | Spain et al. | |
| 6,591,801 B1 | 7/2003 | Fonville | |
| 6,609,717 B2 | 8/2003 | Hinson | |
| 6,658,698 B2 | 12/2003 | Chen | |
| 6,662,411 B2 | 12/2003 | Rubenstein | |
| 6,664,470 B2 | 12/2003 | Nagamoto | |
| 6,677,065 B2 | 1/2004 | Blauer | |
| 6,692,016 B2 | 2/2004 | Yokota | |
| 6,712,329 B2 | 3/2004 | Ishigami et al. | |
| 6,746,172 B2 | 6/2004 | Culpepper | |
| 6,799,758 B2 | 10/2004 | Fries | |
| 6,840,969 B2 | 1/2005 | Kobayashi et al. | |
| 6,857,676 B2 | 2/2005 | Kawaguchi et al. | |

(56) References Cited

U.S. PATENT DOCUMENTS

| | | |
|---|---|---|
| 6,857,809 B2 | 2/2005 | Granata |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 * | 12/2006 | Lian et al. ............... 403/319 |
| 7,172,210 B2 | 2/2007 | Yokota |
| 7,178,855 B2 | 2/2007 | Catron et al. |
| 7,198,315 B2 | 4/2007 | Cass et al. |
| 7,234,852 B2 | 6/2007 | Nishizawa et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,557,051 B2 | 7/2009 | Ryu et al. |
| 7,568,316 B2 | 8/2009 | Choby et al. |
| D602,349 S | 10/2009 | Andersson |
| 7,672,126 B2 | 3/2010 | Yeh |
| 7,677,650 B2 | 3/2010 | Huttenlocher |
| 7,764,853 B2 | 7/2010 | Yi et al. |
| 7,793,998 B2 | 9/2010 | Matsui et al. |
| 7,802,831 B2 | 9/2010 | Isayama et al. |
| 7,828,372 B2 | 11/2010 | Ellison |
| 7,862,272 B2 | 1/2011 | Nakajima |
| 7,869,003 B2 | 1/2011 | Van Doren et al. |
| 7,883,137 B2 | 2/2011 | Bar |
| 7,922,415 B2 * | 4/2011 | Rudduck et al. ............... 403/316 |
| 7,946,684 B2 | 5/2011 | Drury et al. |
| 2,010,239 A1 | 10/2011 | Huang |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 * | 6/2012 | Chen ................. 361/725 |
| 8,261,581 B2 | 9/2012 | Cerruti et al. |
| 8,276,961 B2 | 10/2012 | Kwolek |
| 8,297,137 B2 | 10/2012 | Dole |
| 8,297,661 B2 | 10/2012 | Proulx et al. |
| 8,414,048 B1 | 4/2013 | Kwolek |
| 8,444,199 B2 | 5/2013 | Takeuchi et al. |
| 8,677,573 B2 * | 3/2014 | Lee ................. 24/297 |
| 8,695,201 B2 | 4/2014 | Morris |
| 8,720,016 B2 | 5/2014 | Beaulieu |
| 8,726,473 B2 | 5/2014 | Dole |
| 8,773,846 B2 * | 7/2014 | Wang ................. 361/679.02 |
| 8,826,499 B2 | 9/2014 | Tempesta |
| 8,833,832 B2 | 9/2014 | Whipps |
| 8,834,058 B2 | 9/2014 | Woicke |
| 9,039,318 B2 | 5/2015 | Mantei et al. |
| 9,050,690 B2 | 6/2015 | Hammer et al. |
| 9,061,715 B2 | 6/2015 | Morris |
| 9,067,625 B2 | 6/2015 | Morris |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0007831 A1 * | 1/2003 | Lian et al. ............... 403/374.1 |
| 2003/0080131 A1 | 5/2003 | Fukuo |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0037637 A1 * | 2/2004 | Lian et al. ............... 403/374.1 |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2005/0016116 A1 | 1/2005 | Scherff |
| 2005/0031946 A1 | 2/2005 | Kruger et al. |
| 2005/0054229 A1 | 3/2005 | Tsuya |
| 2005/0082449 A1 | 4/2005 | Kawaguchi et al. |
| 2005/0156409 A1 | 7/2005 | Yokota |
| 2005/0156410 A1 | 7/2005 | Yokota |
| 2005/0156416 A1 | 7/2005 | Yokota |
| 2005/0244250 A1 | 11/2005 | Okada et al. |
| 2006/0102214 A1 | 5/2006 | Clemons |
| 2006/0110109 A1 | 5/2006 | Yi et al. |
| 2006/0113755 A1 | 6/2006 | Yokota |
| 2006/0141318 A1 | 6/2006 | MacKinnon et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0040411 A1 | 2/2007 | Dauvergne |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0144659 A1 | 6/2007 | De La Fuente |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0134652 A1 | 5/2009 | Araki |
| 2009/0141449 A1 | 6/2009 | Yeh |
| 2009/0174207 A1 | 7/2009 | Lota |
| 2009/0265896 A1 | 10/2009 | Beak |
| 2010/0001539 A1 | 1/2010 | Kikuchi et al. |
| 2010/0021267 A1 | 1/2010 | Nitsche |
| 2010/0061045 A1 * | 3/2010 | Chen ................. 361/679.01 |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0247034 A1 | 9/2010 | Yi et al. |
| 2010/0270745 A1 | 10/2010 | Hurlbert et al. |
| 2011/0012378 A1 | 1/2011 | Ueno et al. |
| 2011/0076588 A1 | 3/2011 | Yamaura |
| 2011/0119875 A1 | 5/2011 | Iwasaki |
| 2011/0131918 A1 | 6/2011 | Glynn |
| 2011/0175376 A1 | 7/2011 | Whitens et al. |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0020726 A1 * | 1/2012 | Jan ................. 403/327 |
| 2012/0073094 A1 * | 3/2012 | Bishop ................. 24/594.11 |
| 2012/0115010 A1 | 5/2012 | Smith et al. |
| 2012/0240363 A1 * | 9/2012 | Lee ................. 24/297 |
| 2012/0251226 A1 | 10/2012 | Liu et al. |
| 2012/0261951 A1 | 10/2012 | Mildner et al. |
| 2012/0321379 A1 * | 12/2012 | Wang et al. ............... 403/321 |
| 2013/0019454 A1 | 1/2013 | Colombo et al. |
| 2013/0019455 A1 | 1/2013 | Morris |

(56) References Cited

U.S. PATENT DOCUMENTS

| | | | |
|---|---|---|---|
| 2013/0027852 A1* | 1/2013 | Wang | 361/679.01 |
| 2013/0071181 A1 | 3/2013 | Herzinger et al. | |
| 2013/0157015 A1 | 6/2013 | Morris | |
| 2013/0212858 A1 | 8/2013 | Herzinger et al. | |
| 2013/0269873 A1 | 10/2013 | Herzinger et al. | |
| 2013/0287992 A1 | 10/2013 | Morris | |
| 2014/0033493 A1 | 2/2014 | Morris et al. | |
| 2014/0041176 A1 | 2/2014 | Morris | |
| 2014/0041185 A1 | 2/2014 | Morris et al. | |
| 2014/0041199 A1 | 2/2014 | Morris | |
| 2014/0042704 A1 | 2/2014 | Polewarczyk | |
| 2014/0047691 A1 | 2/2014 | Colombo et al. | |
| 2014/0047697 A1 | 2/2014 | Morris | |
| 2014/0080036 A1 | 3/2014 | Smith et al. | |
| 2014/0132023 A1 | 5/2014 | Watanabe | |
| 2014/0157578 A1 | 6/2014 | Morris et al. | |
| 2014/0159412 A1 | 6/2014 | Morris et al. | |
| 2014/0175774 A1 | 6/2014 | Kansteiner | |
| 2014/0202628 A1 | 7/2014 | Sreetharan et al. | |
| 2014/0208561 A1 | 7/2014 | Colombo et al. | |
| 2014/0208572 A1 | 7/2014 | Colombo et al. | |
| 2014/0220267 A1 | 8/2014 | Morris et al. | |
| 2014/0292013 A1 | 10/2014 | Colombo et al. | |
| 2014/0298638 A1 | 10/2014 | Colombo et al. | |
| 2014/0298640 A1 | 10/2014 | Morris et al. | |
| 2014/0298962 A1 | 10/2014 | Morris et al. | |
| 2014/0300130 A1 | 10/2014 | Morris et al. | |
| 2014/0301103 A1 | 10/2014 | Colombo et al. | |
| 2014/0301777 A1 | 10/2014 | Morris et al. | |
| 2014/0301778 A1 | 10/2014 | Morris et al. | |
| 2014/0360824 A1 | 12/2014 | Morris et al. | |
| 2014/0360826 A1 | 12/2014 | Morris et al. | |
| 2014/0366326 A1 | 12/2014 | Colombo et al. | |
| 2014/0369742 A1 | 12/2014 | Morris et al. | |
| 2014/0369743 A1 | 12/2014 | Morris et al. | |
| 2015/0016864 A1 | 1/2015 | Morris et al. | |
| 2015/0016918 A1 | 1/2015 | Colombo | |
| 2015/0023724 A1 | 1/2015 | Morris et al. | |
| 2015/0050068 A1 | 2/2015 | Morris et al. | |
| 2015/0069779 A1 | 3/2015 | Morris et al. | |
| 2015/0078805 A1 | 3/2015 | Morris et al. | |

FOREIGN PATENT DOCUMENTS

| | | | | |
|---|---|---|---|---|
| CN | 1328521 A | | 12/2001 | |
| CN | 1426872 A | | 7/2003 | |
| CN | 2661972 Y | | 12/2004 | |
| CN | 1670986 A | | 9/2005 | |
| CN | 1693721 A | | 11/2005 | |
| CN | 1774580 A | | 5/2006 | |
| CN | 2888512 Y | | 4/2007 | |
| CN | 2915389 Y | | 6/2007 | |
| CN | 200957794 Y | | 10/2007 | |
| CN | 101250964 A | | 4/2008 | |
| CN | 201259846 Y | | 6/2009 | |
| CN | 201268336 Y | | 7/2009 | |
| CN | 201310827 Y | | 9/2009 | |
| CN | 201540513 U | | 8/2010 | |
| CN | 101821534 | | 9/2010 | |
| CN | 201703439 U | | 1/2011 | |
| CN | 201737062 U | | 2/2011 | |
| CN | 201792722 U | | 4/2011 | |
| CN | 201890285 U | | 7/2011 | |
| CN | 102144102 A | | 8/2011 | |
| CN | 202079532 U | | 12/2011 | |
| CN | 102313952 A | | 1/2012 | |
| CN | 102756633 | | 10/2012 | |
| CN | 202686206 U | | 1/2013 | |
| DE | 1220673 B | * | 2/1959 | |
| DE | 2736012 A1 | * | 8/1976 | |
| DE | 2809746 A1 | | 9/1979 | |
| DE | 3704190 A1 | | 12/1987 | |
| DE | 3711696 A1 | | 10/1988 | |
| DE | 3805693 A1 | | 2/1989 | |
| DE | 3815927 | | 11/1989 | |
| DE | 4002443 A1 | | 8/1991 | |
| DE | 4111245 A1 | * | 10/1991 | F16B 5/06 |
| DE | 9201258 U1 | * | 2/1992 | |
| DE | 29714892 U1 | * | 10/1997 | |
| DE | 29800379 U1 | * | 5/1998 | |
| DE | 69600357 T2 | | 12/1998 | |
| DE | 10234253 B3 | | 4/2004 | |
| DE | 102008005618 A1 | | 7/2009 | |
| DE | 102010028323 A1 | | 11/2011 | |
| DE | 102011050003 A1 | | 10/2012 | |
| DE | 102012212101 B3 | | 7/2013 | |
| EP | 0118796 | | 9/1984 | |
| EP | 1132263 A1 | | 9/2001 | |
| EP | 1273766 A1 | | 1/2003 | |
| EP | 1293384 A2 | | 3/2003 | |
| EP | 1384536 A2 | | 1/2004 | |
| EP | 1388449 A1 | | 2/2004 | |
| EP | 2166235 A2 | * | 3/2010 | |
| EP | 2450259 A1 | | 5/2012 | |
| EP | 2458454 A1 | | 5/2012 | |
| FR | 1369198 A | * | 8/1964 | |
| FR | 2009941 A1 | * | 2/1970 | |
| FR | 2750177 A1 | * | 12/1997 | |
| FR | 2958696 A1 | * | 10/2011 | |
| GB | 2281950 A | | 3/1995 | |
| JP | 2001171554 A | | 6/2001 | |
| JP | 2006205918 | | 8/2006 | |
| JP | 2008307938 A | | 12/2008 | |
| JP | 2009084844 | | 4/2009 | |
| JP | 2009187789 A | | 8/2009 | |
| JP | 2012060791 A | * | 3/2012 | |
| WO | 2008140659 A1 | | 11/2008 | |
| WO | WO 2013191622 A1 | * | 12/2013 | |

OTHER PUBLICATIONS

"Elastic Averaging in Flexture Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.

U.S. Appl. No. 13/330,718, filed Dec. 20, 2011, entitled "Precisely Locating Components in an Infrared Welded Assembly", inventor: Steven E. Morris.

U.S. Appl. No. 13/459,118, filed Apr. 28, 2012, entitled "Stiffened Multi-Layer Compartment Door Assembly Utilizing Elastic Averaging," inventor: Steven E. Morris.

U.S. Appl. No. 13/567,580, filed Aug. 6, 2012, entitled "Semi-Circular Alignment Features of an Elastic Averaging Alignment System", inventors: Steven E. Morris and Thomas F. Bowles.

U.S. Appl. No. 13/570,959, filed Aug. 9, 2012, entitled "Elastic Cantilever Beam Alignment System for Precisely Aligning Components", inventor: Steven E. Morris.

(56) References Cited

OTHER PUBLICATIONS

U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.
U.S. Appl. No. 13/752,449, filed Jan. 29, 2013, entitled "Elastic Insert Alignment Assembly and Method of Reducing Positional Variation", inventors: Steven E. Morris and Michael D. Richardson.
U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.
U.S. Appl. No. 13/851,222, filed Mar. 27, 2013, entitled "Elastically Averaged Alignment System", inventors: Joel Colombo and Steven E. Morris.
U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.
U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed Apr. 4, 2013, entitled "Elastic Tubular Attachment Assembly for Mating Components and Method of Mating Components", inventors: Steven E. Morris and Jennifer P. Lawall.
U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.
U.S. Appl. No. 13/856,973, filed Apr. 4, 2013, entitled "Elastically Deformable Flange Locator Arrangement and Method of Reducing Positional Variation", inventors: Joel Colombo, Steven E. Morris and Michael D. Richardson.
U.S. Appl. No. 13/858,478, filed Apr. 8, 2013, entitled "Elastic Mating Assembly and Method of Elastically Assembling Matable Components", inventors: Steven E. Morris and Jennifer P. Lawall.
U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.
U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.
U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.
U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.
U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.
U.S. Appl. No. 13/918,183, filed Jun. 14, 2013, entitled "Elastic Retaining Assembly for Matable Components and Method of Assembling," inventors: Steven E. Morris and Jennifer P. Lawall.
U.S. Appl. No. 13/939,503, filed Jul. 11, 2013, entitled "Elastically Averaged Alignment Systems and Methods," inventor: Joel Colombo.
U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.
U.S. Appl. No. 13/954,198, filed Jul. 30, 2013, entitled "Elastic Alignment and Retention System and Method," inventors: Steven E. Morris, Edward D. Groninger, and Raymond J. Chess.
U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.
U.S. Appl. No. 13/973,587, filed Aug. 22, 2013, entitled "Elastic Averaging Alignment System and Method," inventors: Steven E. Morris and Jennifer P. Lawall.
U.S. Appl. No. 13/974,729, filed Aug. 23, 2013, entitled "Elastic Averaging Snap Member Aligning and Fastening System", inventors: Steven E. Morris and Jennifer P. Lawall.
U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.
U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.
U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.
U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.
U.S. Appl. No. 14/039,614, filed Sep. 27, 2013, entitled "Elastically Averaged Alignment Systems and Methods," inventor: Steven E. Morris.
U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.
U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.
U.S. Appl. No. 14/045,463, filed Oct. 3, 2013, entitled "Elastically Averaged Alignment Systems and Methods," inventors: Steven E. Morris and Jennifer P. Lawall.
U.S. Appl. No. 14/081,361, filed Nov. 15, 2013, entitled "Elastically Deformable Clip and Method," inventors: Steven E. Morris, Jennifer P. Lawall and Jeffrey M. Gace.
U.S. Appl. No. 14/104,321, filed Dec. 12, 2013, entitled "Alignment and Retention System for a Flexible Assembly," inventors: Steven E. Morris and Jennifer P. Lawall.
U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.
U.S. Appl. No. 14/104,333, filed Dec. 12, 2013, entitled "Alignment System for Providing Precise Alignment and Retention of Components of a Sealable Compartment," inventors: Steven E. Morris, Christopher J. Georgi, Jennifer P. Lawall and Gordan N. Noll.
U.S. Appl. No. 14/104,541, filed Dec. 12, 2013, entitled "Alignment and Retention System for Providing Precise Alignment and Retention of Components," inventors: Steven E. Morris and Jennifer P. Lawall.
U.S. Appl. No. 14/104,549, filed Dec. 12, 2013, entitled "Alignment System for Providing Alignment of Components Having Contoured Features," inventors: Steven E. Morris and Jennifer P. Lawall.
U.S. Appl. No. 14/108,921, filed Dec. 17, 2013, entitled "Elastically Averaged Alignment Systems and Methods Thereof," inventors: Steven E. Morris and Jennifer P. Lawall.
U.S. Appl. No. 14/108,931, filed Dec. 17, 2013, entitled "Elastically Averaged Strap Systems and Methods," inventors: Steven E. Morris and Jennifer P. Lawall.

(56) References Cited

OTHER PUBLICATIONS

U.S. Appl. No. 14/109,296, filed Dec. 17, 2013, entitled "Fastener for Operatively Coupling Matable Components, " inventors: Steven E. Morris and Jennifer P. Lawall.
U.S. Appl. No. 14/134,622, filed Dec. 19, 2013, entitled "Elastic Averaging Alignment of Components Having Contoured Features," inventors: Steven E. Morris and Jennifer P. Lawall.
U.S. Appl. No. 14/134,801, filed Dec. 19, 2013, entitled "Elastically Averaged Alignment Systems and Methods," inventors: Steven E. Morris and Jennifer P. Lawall.
U.S. Appl. No. 14/134,844, filed Dec. 19, 2013, entitled "Elastically Deformable Module Installation Assembly," inventors: Steven E. Morris and Jennifer P. Lawall.
U.S. Appl. No. 14/134,888, filed Dec. 19, 2013, entitled "Elastic Retaining Assembly and Method," inventors: Steven E. Morris and Jennifer P. Lawall.
U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.
U.S. Appl. No. 14/151,279, filed Jan. 9, 2014, entitled "Elastically Averaged Alignment Systems and Methods," inventors: Steven E. Morris and Jennifer P. Lawall.
U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.
U.S. Appl. No. 14/180,882, filed Feb. 14, 2014, entitled "Elastic Tube Alignment System for Precisely Locating Components," inventor: Steven E. Morris.
U.S. Appl. No. 14/181,142, filed Feb. 14, 2014, entitled "Elastic Tube Alignment System for Precisely Locating Components," inventor: Steven E. Morris.
U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.
U.S. Appl. No. 14/185,472, filed Feb. 20, 2014, entitled "Elastically Averaged Alignment Systems and Method," inventors: Steven E. Morris, Jennifer P. Lawall and Kee Hyuk Im.
U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.
U.S. Appl. No. 14/249,746, filed Apr. 10, 2014, entitled "Elastically Averaged Alignment Systems and Methods," inventors: Joel Colombo and Catherine A. Ostrander.
U.S. Appl. No. 14/259,747, filed Apr. 23, 2014, entitled "System for Elastically Averaging Assembly of Components," inventors: Steven E. Morris and Jennifer P. Lawall.
Cross-sectional view of a prior art infrared welded assembly of BMW, Munich, Germany. Believed on the market since about Jan. 1, 2010.
Office Action regarding related CN Application No. 201510087137.X; dated Jun. 3, 2016; 8 pgs.

\* cited by examiner

ELASTICALLY AVERAGED ALIGNMENT SYSTEMS AND METHODS

FIELD OF THE INVENTION

The subject invention relates to matable components and, more specifically, to elastically averaged matable components for alignment and retention.

BACKGROUND

Components, in particular vehicular components used in automotive vehicles, which are to be mated together in a manufacturing process may be mutually located with respect to each other by alignment features that are oversized holes and/or undersized upstanding bosses. Such alignment features are typically sized to provide spacing to freely move the components relative to one another to align them without creating an interference therebetween that would hinder the manufacturing process. One such example includes two-way and/or four-way male alignment features; typically upstanding bosses, which are received into corresponding female alignment features, typically apertures in the form of slots or holes. The components are formed with a predetermined clearance between the male alignment features and their respective female alignment features to match anticipated size and positional variation tolerances of the male and female alignment features that result from manufacturing (or fabrication) variances.

As a result, significant positional variation can occur between two mated components having the aforementioned alignment features, which may contribute to the presence of undesirably large variation in their alignment, particularly with regard to gaps and/or spacing therebetween. In the case where misaligned components are also part of another assembly, such misalignment may also affect the function and/or aesthetic appearance of the entire assembly. Regardless of whether such misalignment is limited to two components or an entire assembly, it can negatively affect function and result in a perception of poor quality. Moreover, clearance between misaligned components may lead to relative motion therebetween, which may cause undesirable noise such as squeaking, rattling, and slapping, and further result in the perception of poor quality.

SUMMARY OF THE INVENTION

In one aspect, an elastically averaged alignment system is provided. The system includes a first component having an interior cavity and an alignment member positioned at least partially within the interior cavity, a second component having an inner wall defining an alignment aperture, the alignment aperture configured to receive the alignment member to couple the first component and the second component, and a third component seated within the interior cavity. The alignment member is an elastically deformable material such that (a) when the third component is inserted into the interior cavity, the alignment member elastically deforms to an elastically averaged configuration to facilitate aligning the third component and the first component in a desired orientation, and (b) when the alignment member is inserted into the alignment aperture, the alignment member further elastically deforms to an elastically averaged final configuration to facilitate aligning the first component and the second component in a desired orientation.

In another aspect, a vehicle is provided. The vehicle includes a body and an elastically averaged alignment system integrally arranged within the body. The elastically averaged alignment system includes a first component having an interior cavity and an alignment member positioned at least partially within the interior cavity, a second component having an inner wall defining an alignment aperture, the alignment aperture configured to receive the alignment member to couple the first component and the second component, and a third component seated within the interior cavity. The alignment member is an elastically deformable material such that (a) when the third component is inserted into the interior cavity, the alignment member elastically deforms to an elastically averaged configuration to facilitate aligning the third component and the first component in a desired orientation, and (b) when the alignment member is inserted into the alignment aperture, the alignment member further elastically deforms to an elastically averaged final configuration to facilitate aligning the first component and the second component in a desired orientation.

In yet another aspect, a method of manufacturing an elastically averaged alignment system is provided. The method includes fabricating a first component having in interior cavity and an alignment member positioned at least partially within the interior cavity, and providing a second component having an inner wall defining an alignment aperture, the alignment aperture configured to receive the alignment member to couple the first component and the second component. The method further includes fabricating a third component, seating the third component within the interior cavity, and fabricating the alignment member from an elastically deformable material such that (a) when the third component is seated in the interior cavity, the alignment member elastically deforms to an elastically averaged configuration to facilitate aligning the third component and the first component in a desired orientation, and (b) when the alignment member is inserted into the alignment aperture, the alignment member further elastically deforms to an elastically averaged final configuration to facilitate aligning the first component and the second component in a desired orientation.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

The following description is merely exemplary in nature and is not intended to limit the present disclosure, its application or uses. For example, the embodiments shown are applicable to vehicle components, but the system disclosed herein may be used with any suitable components to provide securement and elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior, electrical and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to the application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, published as U.S. Pub. No. 2013/0019455, the disclosure of which is incorporated by reference herein in its entirety. The embodiments disclosed above provide the ability to convert an existing component that is not compatible with the above-described elastic averaging principles, or that would be further aided with the inclusion of a four-way elastic averaging system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Described herein are elastic averaging alignment systems and methods. The alignment systems include a component with alignment aperture(s) to receive elastically deformable alignment member(s) of another component. An additional component is inserted within an interior cavity of the component with the alignment aperture(s). The alignment member(s) is configured to be inserted into one alignment aperture(s), and the alignment member(s) elastically deforms to facilitate precisely aligning and securing the components together in a desired orientation.

Figures 1, 3:
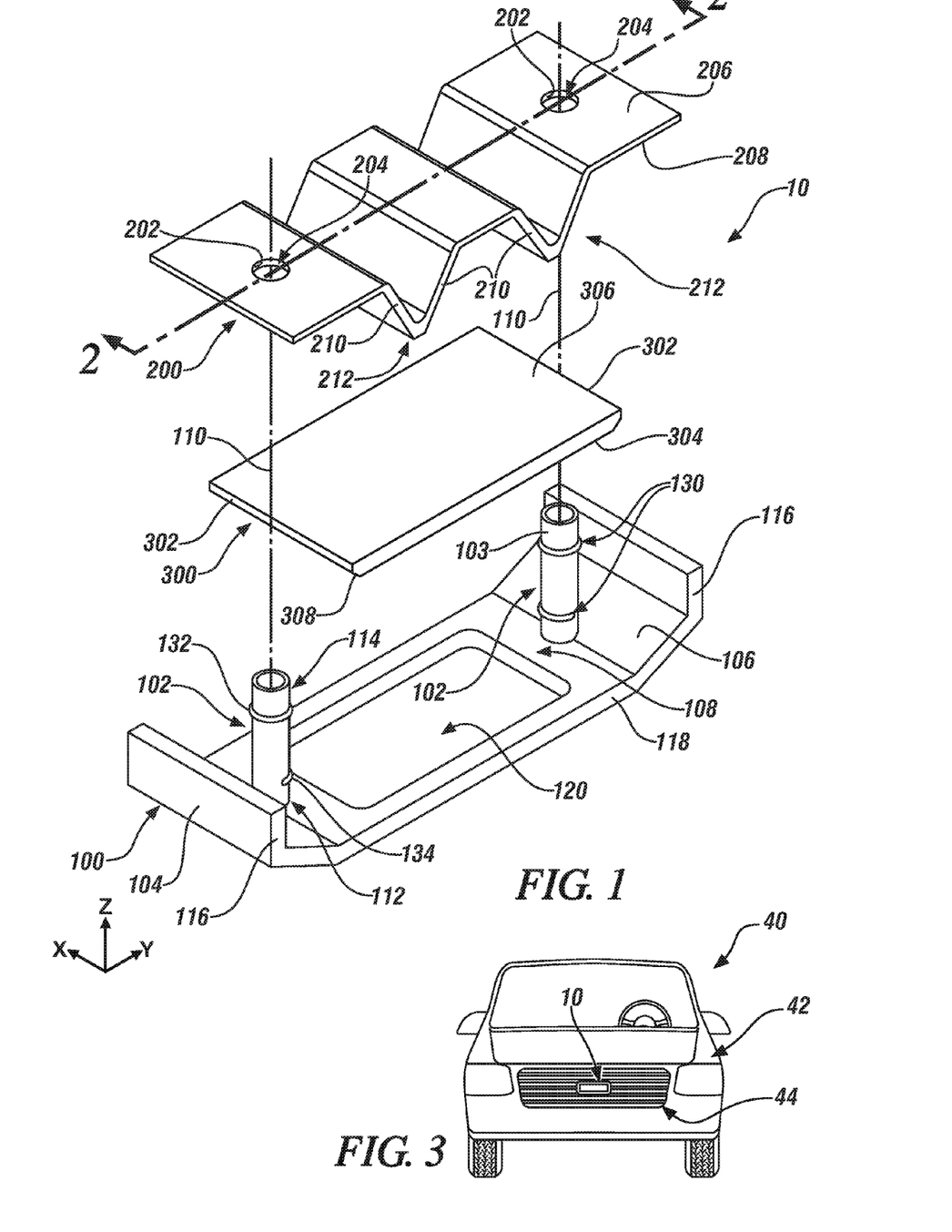
FIG. 1 is a perspective view of an exemplary elastically averaging mating system and before assembly.
FIG. 3 is a front view of a vehicle that may use the elastically averaged alignment system shown in FIGS. 1 and 2.
Figure 2:
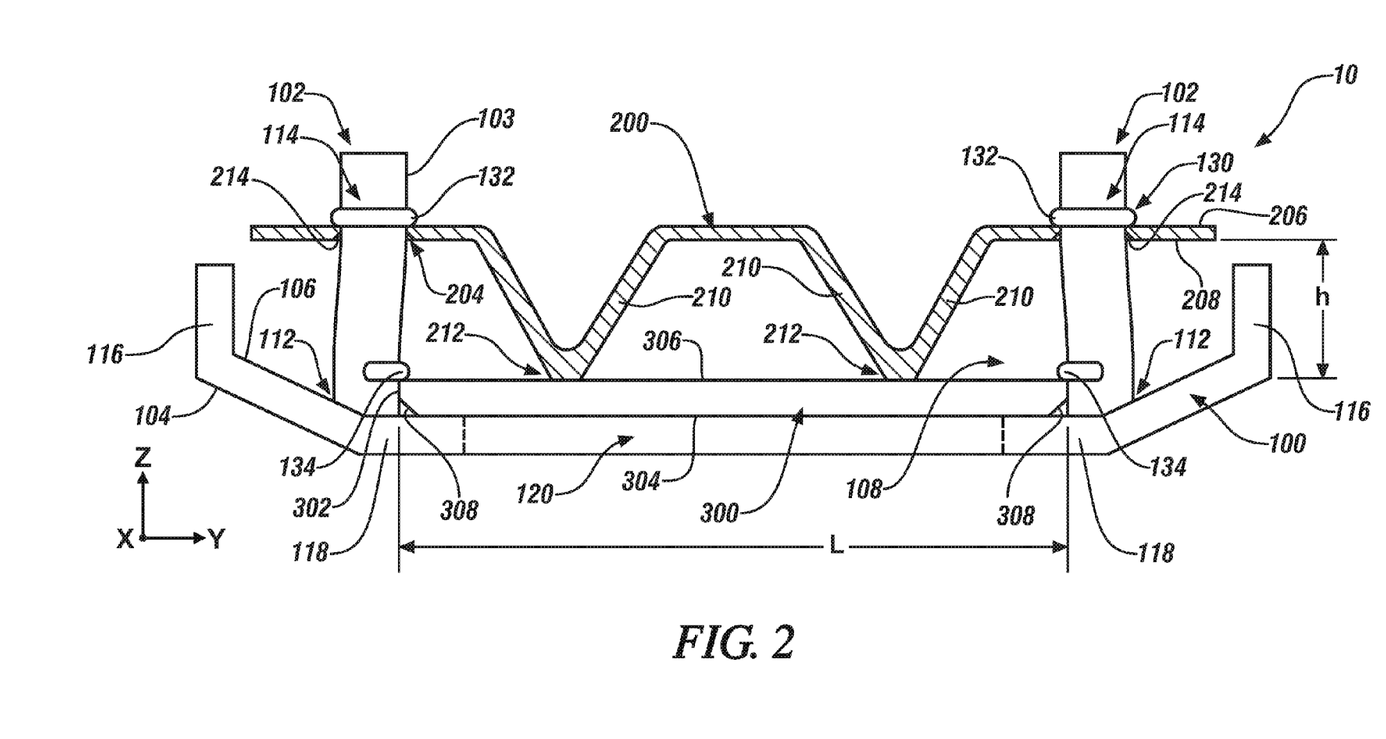
FIG. 2 is a cross-sectional view of the system shown in FIG. 1 taken along section 2-2 and after assembly.

FIGS. 1 and 2 illustrate an exemplary elastically averaged alignment system 10 that generally includes a first component 100 to be mated to a second component 200 and a third component 300.

In the exemplary embodiment, first component 100 includes at least one elastically deformable alignment member 102, and second component includes an inner wall 202 defining at least one alignment aperture 204. Alignment member 102 and alignment aperture 204 are fixedly disposed on or formed integrally with their respective component 100, 200 for proper alignment and orientation when components 100 and 200 are mated. Although two alignment members 102 and two corresponding alignment apertures 204 are illustrated in FIG. 1, components 100 and 200 may have any number and combination of corresponding alignment members 102 and alignment apertures 204.

Elastically deformable alignment member 102 is configured and disposed to interferingly, deformably, and matingly engage alignment aperture 204, as discussed herein in more detail, to precisely align first component 100 with second component 200 in two or four directions, such as the +/−x-direction and the +/−y-direction of an orthogonal coordinate system, for example, which is herein referred to as two-way and four-way alignment. Alignment member 102 is also configured and disposed to interferingly, deformably, and matingly engage third component 300, as discussed herein in more detail, to precisely align first component 100 and third component 300 in two or four directions (e.g., +/−x-direction and the +/−y-direction of an orthogonal coordinate system). Moreover, elastically deformable alignment member 102 matingly engages alignment aperture 204 and third component 300 to facilitate a stiff and rigid connection between first component 100 and second component 200 and between first component 100 and third component 300, thereby reducing or preventing relative movement therebetween.

In the exemplary embodiment, first component 100 generally includes an outer face 104 and an inner face 106 from which alignment member 102 extends Inner face 106 and/or alignment member 102 define an interior cavity 108, and alignment member 102 is disposed at least partially within interior cavity 108. Alignment member 102 is a generally circular hollow tube having a central axis 110, a proximal end 112 coupled to inner face 106, and a distal end 114. However, alignment member 102 may have any cross-sectional shape that enables system 10 to function as described herein. First component 100 includes an outer flange 116 and an inner flange 118 that defines an aperture 120. In the exemplary embodiment, first component 100 is fabricated from a rigid material such as plastic. However, first component 100 may be fabricated from any suitable material that enables system 10 to function as described herein.

Second component 200 generally includes an outer face 206 and an inner face 208. In the exemplary embodiment, alignment aperture 204 is illustrated as having a generally circular cross-section. Alternatively, alignment aperture 204 may have any shape that enables system 10 to function as described herein. For example, alignment aperture 204 may be an elongated slot (e.g., similar to the shape of elastic tube alignment system described in co-pending U.S. patent application Ser. No. 13/187,675 and particularly illustrated in FIG. 13 of the same). Second component 200 further includes support members 210 extending into contact with component 300 for support thereof (FIG. 2). In the exemplary embodiment, support members 210 define a generally V-shaped support 212. However, second component may have any other suitable shape such as, for example, a corrugated or rectangular shape defined by the support members. Further, while two supports 212 are illustrated, second component 200 may be formed with any suitable number of supports that enables system 10 to function as described herein. In the exemplary embodiment, second component 200 is fabricated from a rigid material such as sheet metal. However, second component 200 may be fabricated from any suitable material that enables system 10 to function as described herein.

In the exemplary embodiment, third component 300 generally includes an outer edge 302, an outer face 304, and an inner face 306. As illustrated in FIG. 2, outer edge 302 may include a chamfer 308 to facilitate insertion of third component 300 into interior cavity 108 of first component 100. Although third component 300 is illustrated as generally rectangular, third component 300 may have any suitable shape that enables system 10 to function as described herein. In the exemplary embodiment, third component 300 is fabricated from a rigid material such as plastic. However, third component 300 may be fabricated from any suitable material that enables system 10 to function as described herein.

While not being limited to any particular structure, first component 100 may be a bezel or an intermediate component of a vehicle with the customer-visible side being outer face 104. Second component 200 may be a supporting substructure that is part of, or is attached to, the vehicle and on which first component 100 is fixedly mounted in precise alignment. Component 300 may be a decorative insert or trim component with the customer-visible side being outer face 304.

To provide an arrangement where elastically deformable alignment member 102 is configured and disposed to interferingly, deformably and matingly engage alignment aperture 204, a diameter or cross-section of alignment aperture 204 is less than the diameter or cross-section of alignment member 102, which necessarily creates a purposeful interference fit between the elastically deformable alignment member 102 and alignment aperture 204. Further, second component 200 may include a chamfer 214 to facilitate insertion of alignment member 102. As such, when inserted into alignment aperture 204, portions of the elastically deformable alignment member 102 elastically deform to an elastically averaged final configuration that aligns alignment member 102 with the alignment aperture 204 in four planar orthogonal directions (the +/−x-direction and the +/−y-direction). Where alignment aperture 204 is an elongated slot (not shown), alignment member 102 is aligned in two planar orthogonal directions (the +/−x-direction or the +/−y-direction).

To provide an arrangement where elastically deformable alignment member 102 is configured and disposed to interferingly, deformably and matingly engage third component 300, a cross-section of at least a portion of interior cavity 108 (e.g. between opposed alignment members 102, between alignment member 102 and another portion of first component 100, etc.) is less than a length "L" or cross-section of third component 300, which necessarily creates a purposeful interference fit between the elastically deformable alignment member 102 and third component 300. Further, third component 300 may include chamfer 308 to facilitate insertion of third component. As such, when third component 300 is inserted into interior cavity 108, portions of the elastically deformable alignment member 102 elastically deform to an elastically averaged configuration that aligns third component 300 with first component 100 in two or four planar orthogonal directions (the +/−x-direction and the +/−y-direction). As such, in the exemplary embodiment, at least a portion of outer face 304 is visible through aperture 120.

As shown in FIGS. 1 and 2, alignment member 102 includes retention features 130 to facilitate retention of alignment member 102 within alignment aperture 204 and to facilitate retention of third component 300 within first component interior cavity 108. In the exemplary embodiment, retention feature 130 includes a first lip or rib 132 extending from an outer wall 103 of alignment member 102 proximate distal end 114, and a second lip or rib 134 extending from outer wall 103 proximate proximal end 112. Rib 132 extends at least partially about the circumference of outer wall 103 and is configured to engage outer face 206 and/or inner wall 202. For example, retention rib 132 interferingly engages outer face 206 to increase the amount of force required to disengage or otherwise remove alignment member 102 from within alignment aperture 204. Rib 134 extends at least partially about the circumference of outer wall 103 and is configured to engage third component inner face 306 and/or outer edge 302. For example, retention rib 134 interferingly engages inner face 306 to increase the amount of force required to disengage or otherwise remove third component 300 from within first component interior cavity 108. Alternatively, retention feature 130 may have any suitable shape that enables system 10 to function as described herein. Accordingly, retention features 130 facilitate improved retention of alignment member 102 within alignment aperture 204 and improved retention of third component 300 within interior cavity 108. In addition, retention rib 134 and support 212 facilitate holding third component 300 in the +/−z-direction.

While FIG. 1 depicts two elastically deformable alignment members 102 for corresponding alignment apertures 204 to provide four-way alignment of first component 100 relative to second component 200, it will be appreciated that the scope of invention is not so limited and encompasses other quantities and types of elastically deformable alignment elements used in conjunction with the elastically deformable alignment member 102 and corresponding alignment aperture 204. Moreover, third component 300 may include any number of individual elements that together comprise third component 300.

In an exemplary construction, third component 300 is inserted into interior cavity 108 between opposed alignment members 102 such that outer edge 302 passes over retention rib 134. Third component 300 is seated or secured within first component 100 such that outer edge 302 abuts against alignment member 102 below rib 134, inner face 306 abuts against retention rib 134, and/or a portion of outer face 304 abuts against inner flange 118. Because the length or cross-section of third component 300 is larger than that of interior cavity 108 between opposed alignment members 102, alignment members 102 are elastically deformed outward toward respective outer flanges 116.

First component 100 is coupled to second component 200 by inserting each alignment member 102 into a corresponding alignment aperture 204 until support 212 rests against third component inner face 306 to further facilitate securing third component 300 within interior cavity 108. Support 212 provides a support platform at a height "h" below second component inner face 208 upon which third component inner face 306 rests when elastically deformable alignment member 102 is configured and disposed to interferingly, deformably and matingly engage alignment aperture 204. Accordingly, alignment member 102 elastically deforms within alignment aperture 204 to precisely align components 100, 200. Additionally, alignment member distal end 114 is elastically deformed and forced away from outer flange 116 by alignment aperture 204, thereby facilitating securing third component 300 and precisely aligning components 100, 300.

In view of the foregoing, and with reference now to FIG. 3, it will be appreciated that an embodiment of the invention also includes a vehicle 40 having a body 42 with an elastically averaging alignment system 10 as herein disclosed integrally arranged with the body 42. In the embodiment of FIG. 3, elastically averaging alignment system 10 is depicted forming at least a portion of a front grill 44 of the vehicle 40. However, it is contemplated that an elastically averaging alignment system 10 as herein disclosed may be utilized with other multi-layered components of the vehicle 40, such as exterior decorative trim and inserts, interior decorative trim, instrument panel decorative trim, multi-layer trim doors, and console component stacks.

An exemplary method of fabricating elastically averaged alignment system 10 includes forming first component 100 with at least one alignment member 102, forming or providing second component with inner wall 202 defining at least one alignment aperture 204, and forming third component 300. Alignment member 102 is formed to be elastically deformable such that when alignment member 102 is inserted into alignment aperture 204, alignment member 102 elastically deforms to an elastically averaged final configuration to facilitate aligning first component 100 and second component 200 in a desired orientation. When third component 300 is inserted into interior cavity 108, alignment member 102 elastically deforms to an elastically averaged final configuration to facilitate aligning first component 100 and third component 300 in a desired orientation. Alignment member 102 may be formed with one or more retention member 130 extending from outer surface 103. For example, alignment member 102 may be formed with first retention rib 132 at least partially circumscribing distal end 114 and/or second retention rib 134 at least partially circumscribing proximal end 112.

Systems and methods for elastically averaging mating and alignment systems are described herein. The systems generally include a first component with an elastically deformable alignment member positioned for insertion into an alignment aperture of a second component, as well as a third component configured for insertion into a portion of the first component. The mating of the first and second components is elastically averaged over each pair of corresponding alignment member and alignment aperture to precisely mate the components in a desired orientation. The mating of the first and third components is elastically averaged over at least one alignment member to precisely mate the components in a desired orientation. As such, the systems provide superior alignment because both second and third components are elastically located to the first component. Moreover, the systems include retention members to facilitate retention of the alignment member within the alignment aperture and retention of the third component within the first component. Accordingly, the described systems and methods facilitate precise alignment of three or more components in a desired orientation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:
1. An elastically averaged alignment system comprising:
a first component comprising an interior cavity and a pair of alignment members positioned at least partially within the interior cavity and spaced from each other;
a second component comprising a pair of inner walls defining a pair of alignment apertures, the alignment apertures configured to receive the alignment members to couple the first component and the second component;

a third component seated within the interior cavity and disposed between the first component and the second component, the third component disposed completely between the pair of alignment members;

a first retaining rib extending from an outer surface of each of the alignment members at a first axial location of the alignment members, each first retaining rib abutting against the third component to facilitate securing the third component within the interior cavity; and a second retaining rib extending from the outer surface of each of the alignment members at a second axial location of the alignment members, each second retaining rib engaging the second component to facilitate retaining at least a portion of the alignment members within the alignment apertures, wherein each of the alignment members is an elastically deformable material such that (a) when the third component is inserted into the interior cavity, the alignment members elastically deform to an elastically averaged configuration to facilitate aligning the third component and the first component in a desired orientation, and (b) when each of the alignment members is inserted into the alignment apertures, the alignment members further elastically deforming to an elastically averaged final configuration to facilitate aligning the first component and the second component in a desired orientation, wherein the third component comprises an outer edge, the outer edge abutting against the pair of alignment members to elastically deform the alignment members to the elastically averaged configuration, wherein a portion of the second component abuts against the third component to support the third component when each of the alignment members is inserted into the alignment apertures.

2. The alignment system of claim 1, wherein portions of the elastically deformable alignment member of respective ones of the more than one elastically deformable alignment members, when engaged with respective ones of the more than one elastically deformable alignment apertures, elastically deform to an elastically averaged final configuration that further aligns the first component and the second component in at least two of four planar orthogonal directions.

3. A vehicle comprising:
a body; and
an elastically averaged alignment system integrally arranged within the body, the elastically averaged alignment system comprising:
  a first component comprising an interior cavity and a pair of alignment members positioned at least partially within the interior cavity and spaced from each other;
  a second component comprising a pair of inner walls defining a pair of alignment apertures, the alignment apertures configured to receive the alignment members to couple the first component and the second component;
  a third component seated within the interior cavity and disposed between the first component and the second component, the third component disposed completely between the pair of alignment members;
  a first retaining rib extending from an outer surface of each of the alignment members at a first axial location of the alignment members, each first retaining rib abutting against the third component to facilitate securing the third component within the interior cavity; and
  a second retaining rib extending from the outer surface of each of the alignment members at a second axial location of the alignment members, each second retaining rib engaging the second component to facilitate retaining at least a portion of the alignment members within the alignment apertures,
  wherein each of the alignment members is an elastically deformable material such that (a) when the third component is inserted into the interior cavity, the alignment members elastically deforming to an elastically averaged configuration to facilitate aligning the third component and the first component in a desired orientation, and (b) when each of the alignment members is inserted into the alignment apertures, the alignment members further elastically deforming to an elastically averaged final configuration to facilitate aligning the first component and the second component in a desired orientation, wherein the third component comprises an outer edge, the outer edge abutting against the pair of alignment members to elastically deform the alignment members to the elastically averaged configuration, wherein a portion of the second component abuts against the third component to support the third component when each of the alignment members is inserted into the alignment apertures.

4. The vehicle of claim 3, wherein each of the alignment members, when inserted into one of the alignment apertures, elastically deforms to the elastically averaged final configuration such that a manufacturing variance of each of the first and second components is averaged over the total of the alignment members.

5. A method of manufacturing an elastically averaged alignment system, the method comprising:
fabricating a first component comprising an interior cavity and a pair of alignment members positioned at least partially within the interior cavity and spaced from each other;
providing a second component comprising a pair of inner walls defining a pair of alignment apertures, the alignment apertures configured to receive the alignment members to couple the first component and the second component;
fabricating a third component;
seating the third component within the interior cavity between the first component and the second component, the third component positioned to be completely disposed between the pair of alignment members;
forming a first retaining rib extending from an outer surface of each of the alignment members at a first axial location of the alignment members, each first retaining rib abutting against the third component to facilitate securing the third component within the interior cavity; and
forming a second retaining rib extending from the outer surface of each of the alignment members at a second axial location of the alignment members, each second retaining rib engaging the second component to facilitate retaining at least a portion of the alignment members within the alignment apertures,
wherein each of the alignment members is fabricated from an elastically deformable material such that (a) when the third component is seated in the interior cavity, the alignment members elastically deform to an elastically averaged configuration to facilitate aligning the third component and the first component in a desired orientation, and (b) when each of the alignment member is inserted into the alignment apertures, the alignment members further elastically deform to an elastically averaged final configuration to facilitate aligning the first component and the second component in a desired orientation, wherein the third component comprises an outer edge, the outer edge abutting against the pair of alignment members to elastically deform the alignment members to the elastically averaged configuration, wherein a portion of the second component abuts against the third component to support the third component when each of the alignment members is inserted into the alignment apertures.

6. The method of claim 5, wherein each of the alignment members, when inserted into one of the alignment apertures, elastically deforms to the elastically averaged final configuration such that a manufacturing variance of each of the first and second components is averaged over the total of the alignment members.

\* \* \* \* \*